United States Patent [19]

Field

[11] 4,000,367

[45] Dec. 28, 1976

[54] APPARATUS FOR PRODUCING DEPTH EFFECT IN TWO DIMENSIONAL PICTURES

[76] Inventor: Lester M. Field, 4139 Via Marina 8-805, Marina Del Rey, Calif. 90291

[22] Filed: Nov. 17, 1975

[21] Appl. No.: 632,281

[52] U.S. Cl. .............................. 358/255; 350/124
[51] Int. Cl.² .................... H04N 5/65; H01J 29/89; G03B 21/56
[58] Field of Search ................. 178/7.85, 7.82, 7.9, 178/7.91; 350/124

[56] References Cited

UNITED STATES PATENTS

| | | | |
|---|---|---|---|
| 1,284,084 | 11/1918 | Flint | 350/124 |
| 2,482,031 | 9/1949 | Rose | 178/7.82 |
| 2,496,752 | 2/1950 | Rose | 178/7.91 |
| 2,692,983 | 10/1954 | Eisenkramer | 178/7.82 |
| 2,837,734 | 6/1958 | Bowie | 178/7.82 |
| 2,905,053 | 9/1959 | Stableford | 350/124 |
| 3,632,873 | 1/1972 | Henkin | 178/7.85 |
| 3,785,720 | 1/1974 | Kyryluk | 178/7.85 |

*Primary Examiner*—Howard W. Britton
*Attorney, Agent, or Firm*—Noel B. Hammond

[57] ABSTRACT

Embodiments of an apparatus and design principles for its operation have been devised such that when these embodiments are placed at the screen of a television set (preferably color) or at a movie screen or at an appropriate photograph, a highly noticeable observation of depth is produced. This is done without apparatus at the eyes and without using multiple images as in stereoscopy.

29 Claims, 21 Drawing Figures

Fig. 1.
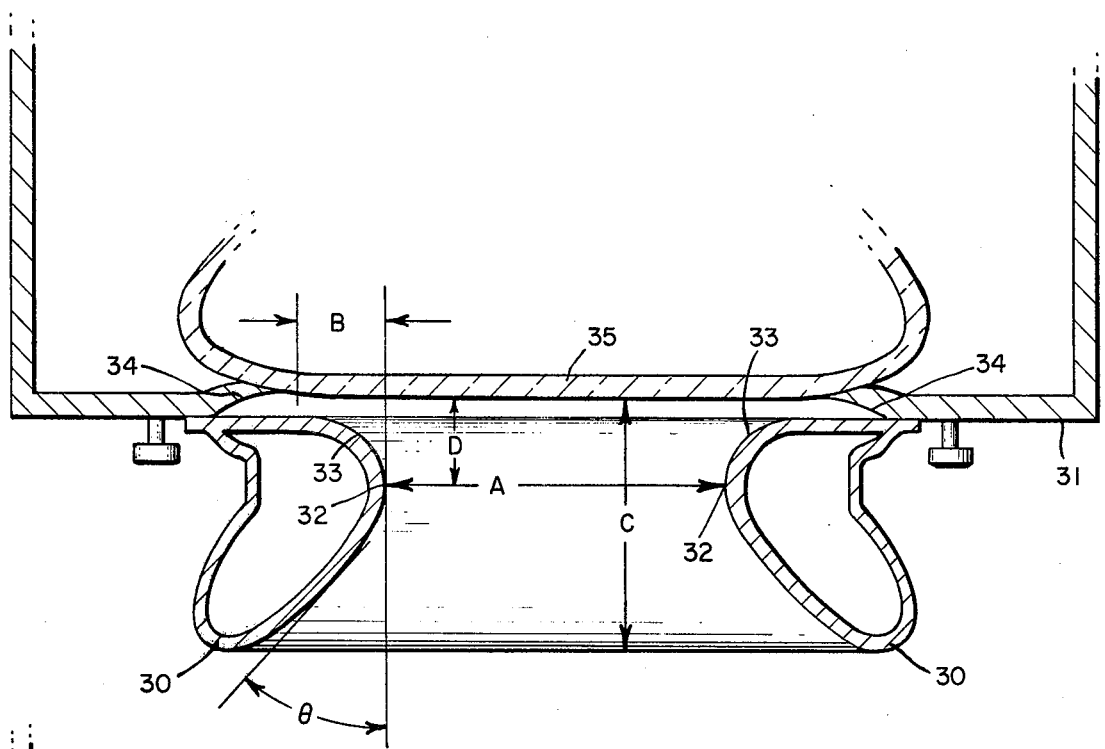
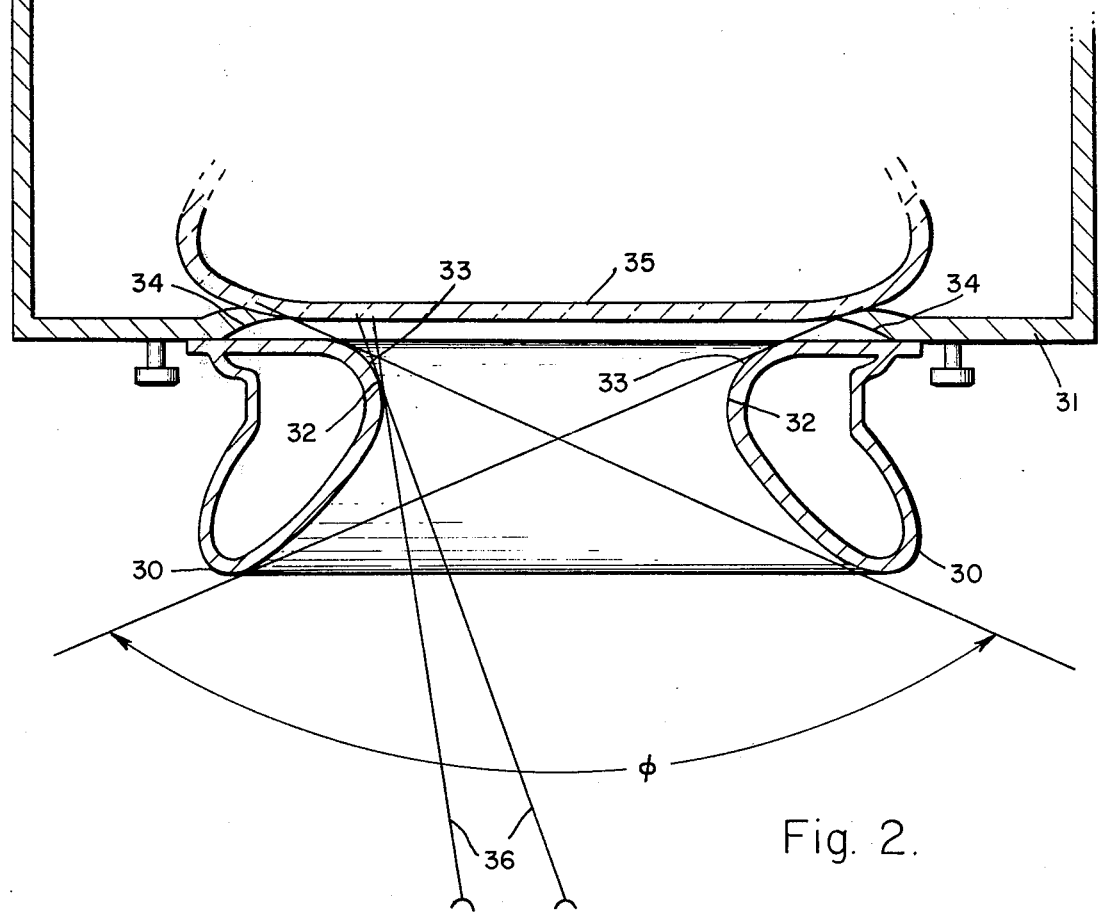
Fig. 2.

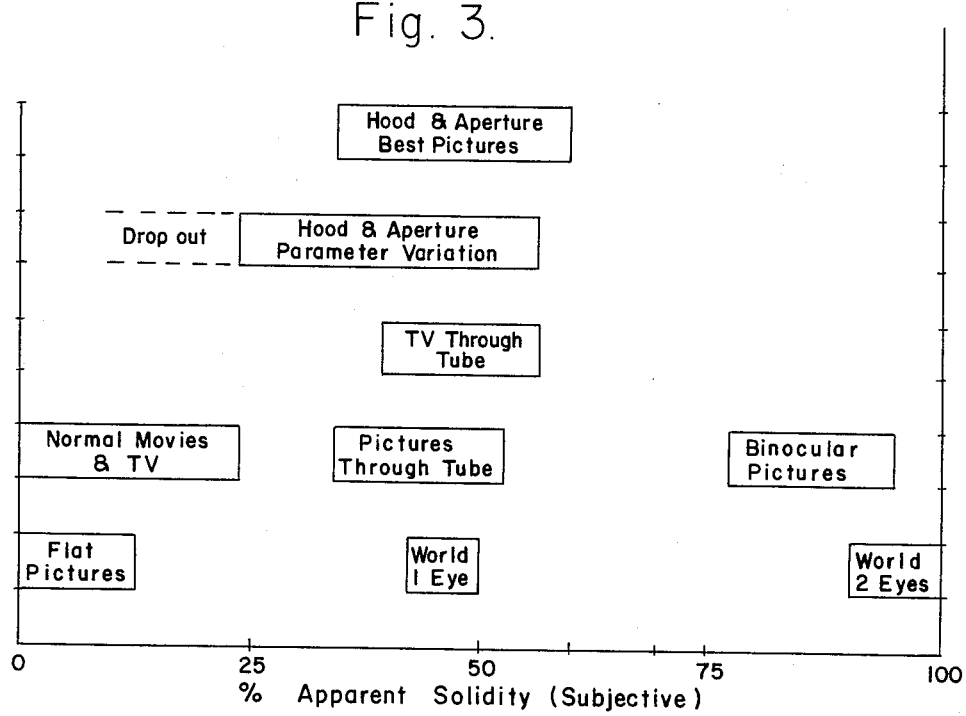
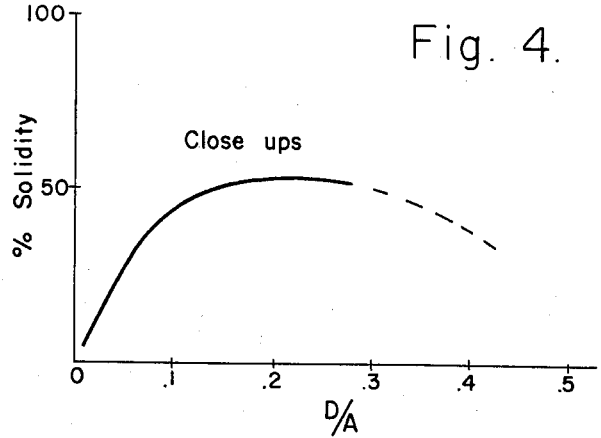
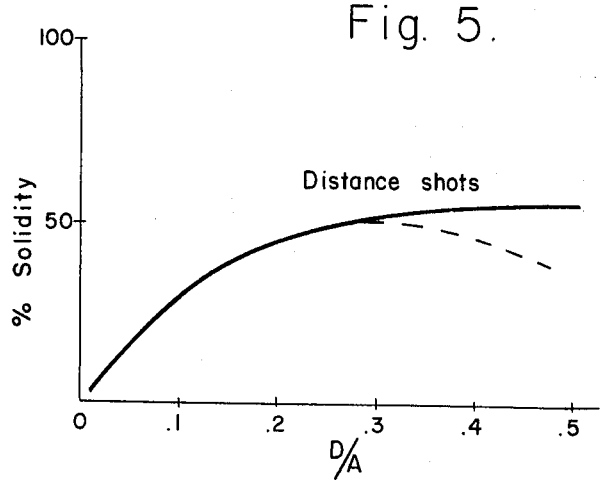

Theoretical Design Parameters

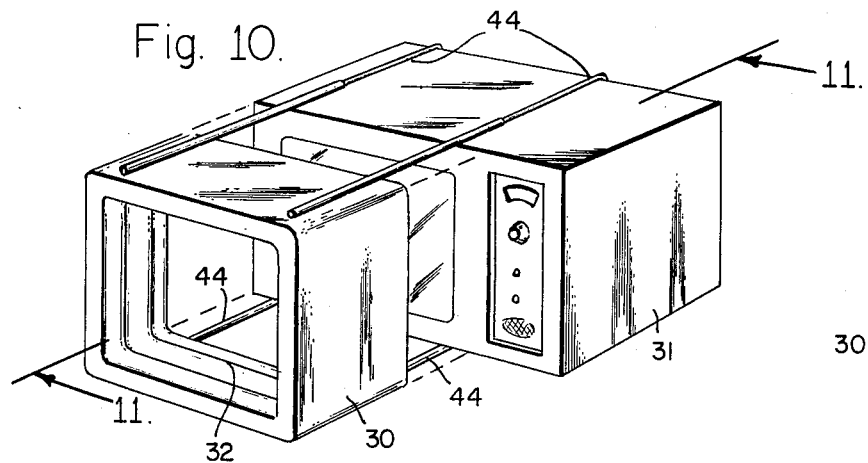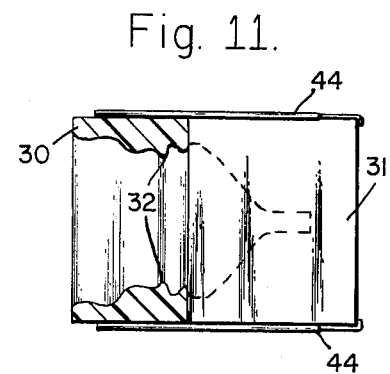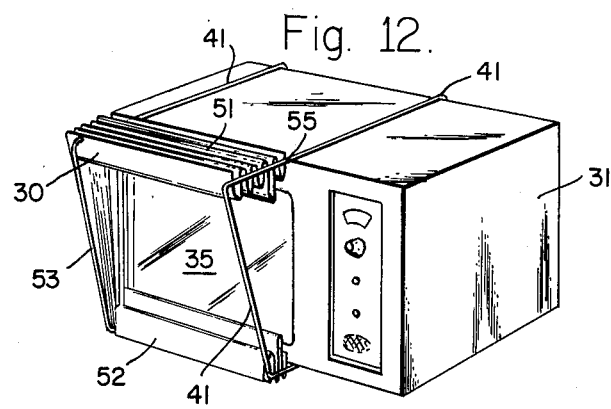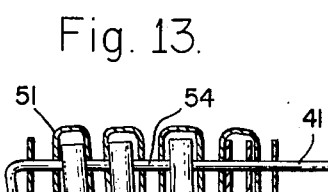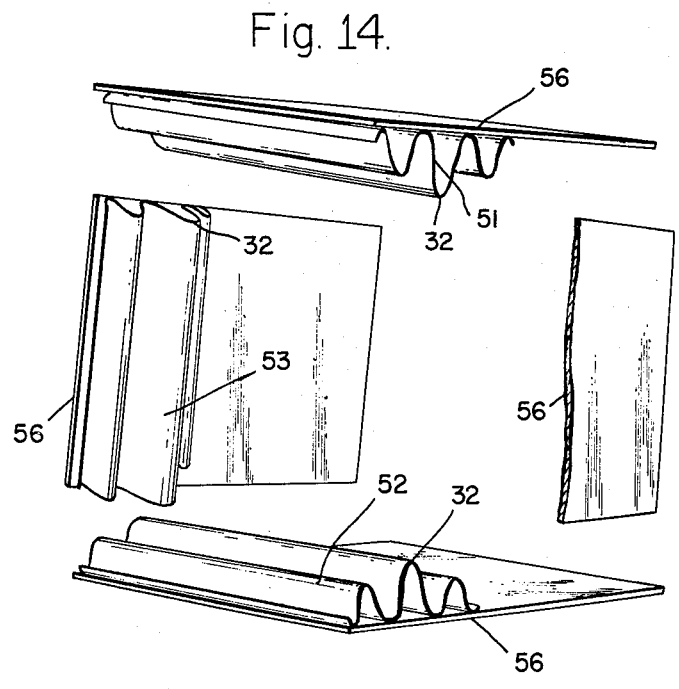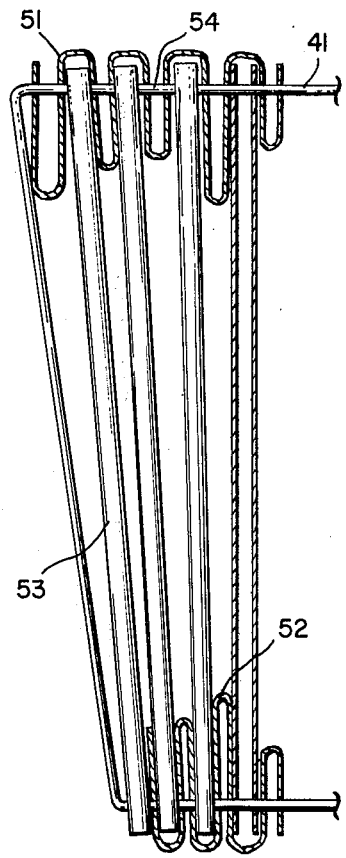

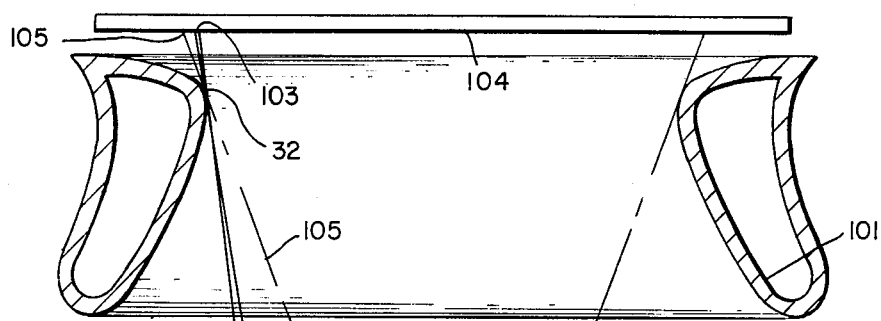
Fig. 20.
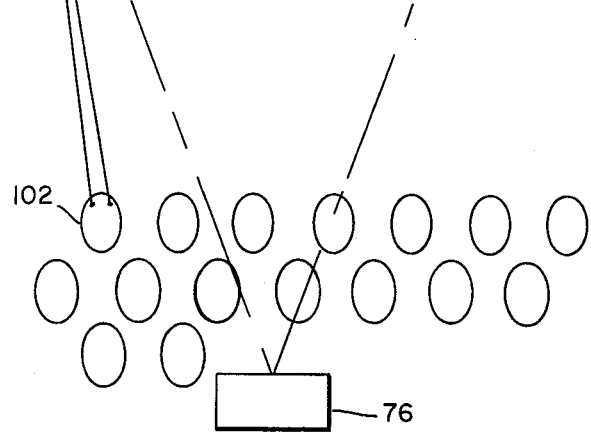
Fig. 21.
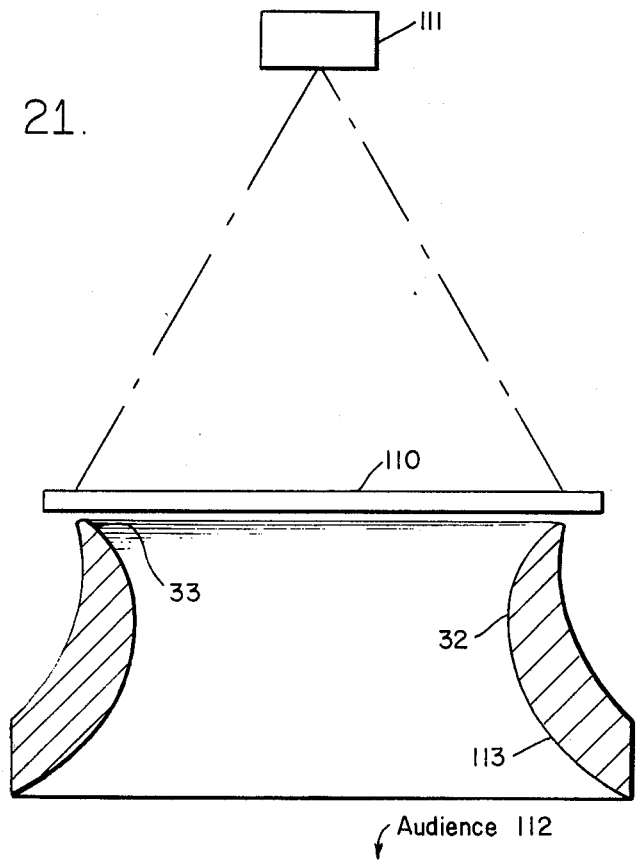
Audience 112

APPARATUS FOR PRODUCING DEPTH EFFECT IN TWO DIMENSIONAL PICTURES

Viewing may be done from a wide angle in front of the screen. When used to view color television or motion pictures, depth effects are immediately evident and in scenes containing both near and far objects, depth observation is quite strong (to the point of visceral feelings on objects rushing toward the observer or scenes taken from high buildings with good perspective). Closeups show remarkable solidity. The picture returns instantly to its usual flat appearance if the apparatus is removed.

It is evident that stereopsis is not the only process involved in three-dimensional vision. Looking at a good color photograph or poster, containing substantial perspective, through a tube of typically 1 inch diameter and 6 inch length (or equivalent device), held at the eye, produces a remarkable appearance of depth if the field of view is slightly smaller than the total picture. Using such a tube to view color television, or motion pictures in a theater, produces somewhat similar depth effects as those described above for the apparatus at the screen. However, the apparatus at the screen permits the use of both eyes; is very importantly on the screen and not on the observer, and allows a wide viewing angle so that large audiences may participate.

Simply putting a large tube projecting out from the screen produces negligible effects. The conventional edge masks used in present day television receivers or motion picture theater screens also produce negligible depth effects. Any system used may be tested by comparing its depth enhancement with that of a tube held at the eye.

However, a unique depth method of masking picture edges depending primarily upon proper amount of separation of limiting aperture from picture plane; appropriate visibility of limiting aperture; and flare, shape, and reflectivity of cowls surrounding the limiting aperture affect the resulting "solidity" greatly, as observed by comparison with the tube at the eye. These can be optimized by use of the measuring tube technique to produce the results described. Optimization is often contrary to preconceived guesses or "common sense" because the phenomena involved are eye-nerve-network-brain or psychovisual phenomena which are not common to experience.

Appropriate combinations of elements suitable for television receivers, movie and slide projection, viewing of photographs and similar uses are described. Principles of optimizing and typical embodiments are given.

It becomes apparent that conventional usage of screen treatments in TV, movies and photography are generally contrary to these principles and embodiments and produce little or none of these effects when measured as described here.

BACKGROUND OF THE INVENTION

This invention relates to apparatus which produces a highly noticeable, useful and quickly remarked-upon appearance of depth or three-dimensionality when applied to a television screen, a motion picture screen or single still slide projections or pictures, or the like. The invention does not depend upon stereoscopic methods (a separate picture for each eye) and it employs apparatus at the screen rather than at the eyes. Hence, it is suitable for simultaneous viewing by several people or large audiences.

This invention comes in part from recognizing that stereopsis (the total process involving two eyes and the nerve connections and brain mechanism trained to interpret slight differences between the two pictures as indicating depth or three-dimensionality) is *not* the only clue to three-dimensional vision. Quite the contrary, at least ten other clues exist and will be detailed later. This invention is based on properly suppressing stereoptic and other information which indicates that the picture is flat, and allowing other clues to come forward to construct an appearance of depth which the brain readily accepts. A case in point is that if an observer closes one eye and looks at the world with the other, after a few moments the world looks three-dimensional, possessed of depth, and very obviously not any thing like a flat picture; yet no stereopsis is taking place, since with one eye, no stereoscopic clues are present.

Before describing the invention and the principles on which it is believed to work, both the successes and the still enormous problems of the stereoscopic approach will first be discussed as necessary background to the usefulness and need for this invention.

The use of stereopsis to provide a depth illusion from two-dimensional pictures has resulted in many means, over the years, to provide each eye with a slightly different picture (usually pictures taken from positions a few inches apart horizontally, corresponding to the spacing between the eyes). The greatest ingenuity has been exercised to get these pictures to be seen separately by each eye. To this end, many techniques have been used, starting with the old-fashioned stereoscope with two lenses and a septum to help the observer combine the two pictures and yet prevent each eye from seeing both pictures. A version of this is used to this day with 3-D viewers for looking at transparencies, or in the commercially available stereo picture sets called Viewmaster. These have been very successful.

The real difficulty arises, however, when a three-dimensional effect is desired to be shown to an audience of many people, or even a few people simultaneously. Then the problem of getting a different picture to each eye of each observer becomes formidable and no commercially successful device has appeared.

To solve this problem, one of the earliest used methods was the use of a different color filter for each eye to separate pictures. Still later, polarization filters enabled even full color pictures to be seen separately by each eye. These were applied to motion pictures as well as to projected color slides. The major objection to these methods is that the viewer finds it distasteful and awkward to have any apparatus applied near or over his eyes, and as a result, these devices have not enjoyed great commercial success.

Later, somewhat useful devices were invented to avoid this problem by putting lenses at the picture, such as a series of strip pictures with prisms in front of them for advertising matchcovers or the now familiar 3-D picture postcards. Unfortunately, the application of this principle to large projected motion pictures or to home television receivers is extremely difficult, is seldom attempted and has not been commercially successful.

Recently, holography has produced relatively small 3-D pictures requiring no apparatus at the viewers' eyes. Unfortunately, the rest of the process is ill-adapted to either television or movie theaters and requires many inventions now beyond the state of the art.

Also, certain aspects appear highly impractical, such as the probable requirement that each television station occupy tens or hundreds of times the space in the spectrum which it now uses, because of the enormous resolution requirements of holography. Even with such colossally economically difficult usage, much invention would be required, such as television receivers with dozens to hundreds of times present resolution and light valve rather than kinescope output to permit laser illumination to be used.

As for holography used for technicolor movies, this would require film of resolution dozens of times what is now used, and probably of gigantic size, unless gigantic light valves and screens are invented (with resolution related to the wavelength of light, not proportioned to screen size). Suffice it to say that the inventor of holography is known, through issued patents, to be working on the use of holography to produce a theater lens system on the screen (holography can do that), just once during theater or screen construction, and the lenses will then direct the light from one projector to the left eye of each person in the theater, and similarly for the right eye. Even this retreat from true holographic pictures to stereoscopic ones, using holography only to construct the initial lens system, is expected to be delicate and difficult.

In motion pictures, Cinerama and Cinemascope have achieved commercial success without stereoscopic or holographic means by projecting the picture around the sides of the observer so as to hide the edges, or at least the sides of the picture, and also to give the viewer something to see in his peripheral vision area. The invention to be described here achieves a similar effect, but does so without the difficulties of extra-wide film or projection, and perhaps more important, can be applied to color (or black and white) television and similar pictures whose subtended angle from the observer is limited and cannot, in any practical way, approach 90° to 180°, as in the special movie theater adaptations of Cinerama and Cinemascope. Consider, for example, the staggering problem of a television screen or tube extending around the sides of the room to surround several observers. The economics of color television pictures gets rapidly out of practicality as one goes from 17 inches to only 30 inches, let alone room size.

The invention to be described here can produce the desired effect as an attachment on normal-sized TV tubes and effectively solves the economic and practical problem outlined in the preceding paragraph. Also, as one of its many other applications, it can make normal-sized movie screens and projection show appreciable depth effect.

What has been needed is an economical apparatus for use with single (not double or stereo) pictures of normal aspect ratio, which provides a depth or three-dimensional effect and works at or near the picture being viewed, so the viewer need not carry or wear any special viewing mechanism or aid, and need not change his normal optical habits or aids, such as his ordinary glasses.

An mentioned previously, the present invention makes a two-dimensional picture or image appear to be three-dimensional by suppressing or eliminating the clues by which an observer or viewer observes that a picture is two-dimensional, so that the viewer will react to other clues present in the picture, which then cause the eye-nerve network-brain mechanism to visualize depth.

A viewer generally observes a picture to be flat and two-dimensional in part because he can mentally locate the plane of the picture by seeing the edge of the picture, which binocular vision and focus judge very strongly and accurately; and in part by seeing the surface characteristics of the picture, such as gloss, texture, smudges, light reflections, and sometimes in television or old movies, noise spots or scratches all over the surface independent of the picture content. These surface characteristics can often be reduced to a negligible factor in practice, particularly in television and movies, and also in good photographs and some realistic or highly photographic paintings. Then it remains to effectively remove the picture edges from view and judgment to enable the many clues to depth contained within the picture itself to do their job of creating a three-dimensional image in the mind of the observer. It is important to note that simply covering the edges does not remove the edge barrier, since the edge of the cover constitutes a new edge, unless something special is done, as will be described later.

First, consider the various clues of both binocular and monocular types which the eye-nerve processing network and brain use to identify depth in a scene.

Two major binocular clues to depth are, the slight difference in angle from each eye to the object, perceived muscularly, and the differences in the picture perceived by each eye because of the distance separation between the eyes. The muscular perception clue is generally thought to be of small significance and disappears beyond a meter or so in distance. The different pictures, particularly the differences at obscuration edges are processed by nerve networks and brain to construct an ordered set of distances for the scene and is the major stereoscopic or binocular clue. An elaborate set of theories has been constructed about this concept, but they will not be described here since the present invention will be primarily avoiding this phenomenon rather than using it.

The invention will, however, be using many of the clues to depth which do not require the binocular interaction of two separated eyes. Some of these clues are:

1. The obscuration of distant objects by near ones.
2. The change in obscuration as a near object passes in front of more distant ones in movies or television, or in real life.
3. Judgments based on covergence with distance of presumed parallel lines, perspective, shape and relative size of well-known objects, and accurate angles and distances between lines heading for infinity and lines presumed to be accurately at right angles to them. These are powerful cues, and deliberate distortions of these have been used to produce many optical illusions.
4. Surface details of well-known objects as a function of distance.
5. Clarity variation with distance due to atmospheric contaminants or scattering, even in clear atmosphere.
6. Color variation with distance due to atmospheric absorption and scattering.

And, the last four to be named at this time:

7. The continuity of the peripheral scene from the observer's own head and shoulders clear around the walls and across the ground to the object.
8. The apparent motion of near objects opposite to observer's head motion, and far objects with head motion.
9. The variation in focus and depth of focus with the distance of an object (valid only out to ten meters or so, and not consciously observed because we keep refocussing all the time as we observe different parts of a scene).

10. The ability of the observer to modify what is being obscured, by moving himself, his head or his eyes, or by using one eye and then the other (often subconsciously).

With the exception of the last four, all of these monocular clues are present in a good color television or color moving picture, but the visible, well-defined edges or sides of the screen and hence the easy automatic ability to determine the screen's precise position in depth by the powerful binocular judgment of the edge, overwhelm the many monocular clues to depth in the picture which, for example, serve so well when one eye is closed to continue to produce a world view with obvious depth.

The literature has described devices to be used at the eye to eliminate the binocular clues which produce the sensation of flatness, and has described how such devices have produced a reasonable depth illusion from two-dimensional pictures. The present invention can produce an even better effect, and does so with apparatus only at the picture, not at the eyes. The effect can be better than that which was described in the literature because, in addition to using all the cues suggested there, we can use both eyes. Most importantly, we can add one cue of the last four with something not in the picture itself, and finally, we have available the advantage of motional obscuration variation within the picture itself if the invention is used on television or movies (both preferably but not necessarily colored).

Formal lists of methods to add depth to two-dimensional pictures in varying degrees of ease of effectiveness are given in two articles which are here quoted. These articles contain other references, sometimes in a foreign language and of earlier dates, but they claim to have summarized the earlier material.

One paper is "The Illusion of Depth from Single Pictures," Optical Society of America, Vol. 10, 1925, pp. 137–148, by A. Ames, Jr. He quotes the following ways of increasing the illusion of depth:

1. Looking at a picture with one eye only.
2. Looking at a picture through an iconoscope (a system of mirrors which effectively decreases the apparent distance between the eyes).
3. Viewing the picture from a great distance. (However, the obviously incorrect perspective usually counteracts the illusion, he says, and loss of surface detail probably also would spoil it.
4. Changing eye convergence via prisms.
5. Looking at a picture through a hole approximately 2mm in diameter held close to the eye. He says this upsets normal monocular depth perception by affecting the normal coordination between diffusion of the image and focusing of the eye. (This probably means it increases the depth of focus.)
6. Using one eye with a lens that changes normal viewing distance. This affects focus and changes perspective.
7. Using both eyes but with a lens such that one eye gets a sharp image and the other a blured one. Blurring only in the horizontal direction is especially good using a cylindrical lens. The illusion is greater than with one eye alone and the reason is quoted as "hard to explain." (It suggests that the stereoscopic binocular brain processes are somehow involved.)
8. Looking at a picture in a mirror.
9. Looking at a picture with abnormal rotation of images about the axes of vision.

The second article, more closely related to the problem being approached here, is "Stereoscopic Depth from Single Pictures," by Harold Schlosberg, American Journal of Psychology, vol. 54, 1941, pp. 601–605. He quotes a number of ways in which flatness cues can be eliminated, permitting depth cues to yield a "plastic" or depth effect.

1. Looking at a picture from a distance.
2. Monocular viewing, (a) through a tube, (b) through a lens, and (c) in a mirror.
3. Partial binocular vision, (a) blurring one eye with a spherical or cylindrical lens, or (b) prisms.
4. With full binocular vision, through a large lens.
5. With mirrors to reduce the apparent separation of the eyes.

This author stresses the relatively "all or none" character of the effect. He states that we do not have a simple addition or subtraction of factors, with more or less depth resulting. He states that the plastic effect seems usually to be either clearly present or absent, although there may be some slight additive effects. In the use of the apparatus to be described, changes in the strength of the effect, particularly in the onset of the effect, with changes in parameters, have been seen.

The invention described herein differs from all of the suggestions in these articles in that it avoids doing anything at the eyes of the observer, but attempts to get as strong a dimensional illusion as any of these methods by working solely at or near the picture being viewed, thus releasing the viewer from carrying any mechanism or changing his normal optical habits or aids, such as ordinary glasses.

Now, in line with the suggestion in Schlosberg's article that looking down a tube will introduce depth perception in single pictures, it is suggested that the effect be tested by the reader as an example of an apparatus at the eye which produces the effect. Use a cardboard tube of approximately one and one-half inches in diameter and 6 to 12 inches in length, or if such is not available, roll up a magazine or report or even several sheets of letter paper to form a tube. Then look through it with one eye, the other kept closes, at, for example, a detailed colored picture which has some appreciable perspective or depth to the scene, while placing oneself at a distance such that the amount of picture shown by the tube opening is almost all of the picture, but the edges or sides of the picture are not visible. The effect is startling for most people.

Substantial solidity or depth sets in, which disappears and reappears as the tube is removed or used. If the picture is one taken from a high place looking down, some people feel strong visceral muscle tightening as in looking down from a height in the real world. This is particularly true when looking at color television or color movie scenes of this nature.

It is suggested that this viewing means be tried also with a good, clear, noise-free picture on a color television receiver and at the movies. the effects are often shocking and visceral. Color commercials, particularly, take on great depth and when zoomed appear to physically rush at or away from the observer by many feet, and may even cause him to duck away from the oncoming object. In movies, complex scenes such as battles or panoramic activities become clearer because of the added dimensionality. Interestingly, especially in TV, full screen heads or hands moving take on strong dimensionality, because of the strong effects of perspective.

It appears that the more often one sees the effects, the stronger and more general they become; apparently the brain quickly trains itself to believe this new mode of viewing. However, almost always the effect is there to a marked degree at the first viewing of an appropriate picture. Chase scenes or daredevil scenes (hanging from a bridge or a window, etc.) become viscerally affecting, and in sports, it becomes far easier to follow the action.

Beyond what the inventor learned from the articles by Schlosberg and Ames previously quoted, he soon found that the use of both eyes, if they look through separate tubes or through a single tube, did not remove the effect, but actually enhanced it, as long as the picture edges or sides were still hidden by the sides of the viewing tubes. This was an unexpected and highly gratifying result, since it suggested that it would be worth while to seek an equivalent device to the tube or tubes at the eyes, which would be at the picture, and that the use of both eyes might not prevent it from working.

At this point in his understanding, the present inventor began experimenting with various attachments to a color television receiver in an attempt to duplicate the effect seen looking down a tube or tubes without having the observer put anything at or near his eyes.

The first experiment was to make a tunnel-like structure of a black cardboard tube, just the size of the picture, or a little smaller, ending sharply on the glass of the picture tube. Surprisingly, this has a relatively minimal effect, if any. What effect there was, may have been caused by the greater contrast available, since the surface of the picture tube was shielded from appreciable extraneous light. The place at which the black cardboard tube ended on the picture tube was sharp and clearly evident and identified the true plane of the picture when looked at normally with two eyes.

Variations were tried, such as having the opening of the cardboard structure toward the observer made smaller than the picture visible area and looking into this limited angle viewing system from the front. This worked poorly, if at all, for depth enhancement.

Then an experiment was made using a rectangular aperture slightly smaller than the color picture, with all four sides consisting of cylinders disposed around the margin of the picture so that the rounded or curved edge which limited the view of the picture tube was closer to the observer than the plane of the picture tube glass, by about one-fifth of a picture diameter. Also, these cylinders hid the edges of the picture tube, so the distance to the plane of the picture was difficult to judge. This produced the depth effect.

Next, following practice in movie theater screen construction or in normal TV masks or bezels, cylinders were tried using dull black light-absorbent material which was almost invisible in a dimly lit room, with the prospect of later going to black velvet, if necessary. This appeared to be in a wrong direction, since all that could be seen from a distance was the picture tube with a sharp, well-defined edge and slight but rather poor depth enhancement.

Next, moderately dark colored cylinders of a dull material were used and a good effect of depth returned, suggesting that the viewing aperture should be moderately visible (extremely bright or bright-colored apertures were found to diminish the effect) and some distance in front of the surface of the glass (typically 5 percent to 30 percent of a picture width). It was essential that the picture be larger than the aperture, and the aperture be spaced out in front of the picture such that the observer's head or eye movements cause greater or lesser amounts of the scene to be revealed, just as when looking out of a window. Even without movement, the right and left eyes see a slightly different amount of picture near the side aperture edges.

To increase the effect of being unable to determine how far the picture tube surface was behind the clearly determinable aperture-producing mechanism, regularity such as a completely cylindrical cross-sectional shape for the edges of the frame or hood is generally to be avoided and hoods of other shapes were tried, with great success. Nevertheless, the effect is strong enough that such cylindrical cross-sectional edges do work, to a degree. As an example of radically different shapes which were tried, a drapery extending outward from the glass surface was used with the limiting aperture provided by folds of the drape well removed from the picture tube surface. Colored, moderately visible drapes work substantially better than black ones.

Looking at the picture produced by draping or other good mask arrangements made in accordance with the principles of the present invention produces a depth effect which does not improve substantially if the picture is looked at through a cardboard tube used at the eye. In fact, this is a good test as to whether or not the principles of the present invention have been properly utilized. If the parameters are not close to their optimum values, as will be described, looking at the picture through a tube at the eye shows a much greater depth than is produced by the apparatus at the screen. When these elements are properly held at values described here as near optimum, little or no change is observed as between a tube at the eye or the use of apparatus at the screen. It appears that the present invention gets essentially all the effect obtainable from removing binocular clues as measured by use of the monocular tube.

The invention also has application to the showing of black and white or color slides and movies. Black and white television is also materially enhanced by this concept, but not quite as strongly as color. For movies and slides, rear projection is the most obvious parallel to picture tube technique, although front projection is not ruled out if projected picture edges are carefully controlled and do not show appreciably on the draping. The black matte frame technique normally used in movie theaters to control the picture edge problem is wrong for this depth perception and gives an apparent sharp edge right at the screen plane, which kills the effect. Testing with a tube at the eye shows great depth enhancement, which indicates how little depth effect normal theater technique is providing.

Similarly, all of the elaborate picture tube frames or bezels used on commercial television receivers may be observed to leave the picture edge in clear view at an easily judged distance, and they do not show the depth enhancement which emerges at the moment the teaching of this invention is utilized. It seems clear that current designers are not aware of these principles and it is in no way intuitive or obvious to persons skilled in the television receiver art that these principles would add depth to their designs. Similarly, when it has been shown to persons skilled in the television art that depth enhancement can be obtained by looking down a tube and suggested that this might be obtainable from a properly designed mask at the tube, their guess is generally a black matte mask, as in common movie technique. This does not work on television, just as it does not work in movies to provide the depth enhancement described here. Again, it is clear that the correct approach described here is not obvious to these practitioners of television design. Over the many years of movie theater and television receiver design, they have not only used schemes which do not show the depth enhancement effect; when shown the effect via a tube at the eye, they guess wrong as to what would work at the screen.

SUMMARY OF THE INVENTION

In accordance with the foregoing principles, a relatively short mask, cowl, or hood is disposed in front of the picture to be viewed. The hood or mask may, if desired, flare out in either a curve or straight line to larger dimensions toward the observers to enlarge the viewing angle and to aid the illusion produced by causing the end of this funnel away from the observer to appear farther away than it is, because of the brain's assumption of parallelism. Long hoods, in imitation of the tube held at the eye, are not only unnecessarily bulky, but do not work as well as short ones. To work at all well, all hoods require the following features.

The interior of the mask or hood should contain a framing aperture smaller than the picture, so that all four edges of the picture are hidden, to prevent easy judgment of the precise position in depth of the picture plane.

The framing aperture should be spaced away from the picture plane toward the observer, again so that the distance to the plane of the picture being viewed is not easily judged. Also, very importantly, this spacing causes motion of the observer or of his head or eyes or the binocular effect of distance between his eyes to reveal different amounts of the picture being observed near the edges, just as though he were looking out of a window at the scene. This helps to clearly detach the aperture from the picture, and allows the monocular clues to depth to function over the rest of the picture without being overpowered by the edges.

The framing aperture and a substantial portion of the mask or hood between the aperture and the observer should be clearly visible, but not obtrusive, to the observers or audience while watching the picture. Visibility may be maintained by making the aperture and hood or mask of a colored or textured material, if it is a dull, non-specular material. The material may be shiny or specular, although such material is not preferred because of the high variability of what if reflects. When somewhat dark materials, even black, are used for the hood and aperture, they still work if illuminated sufficiently so as to be slightly visible, either intentionally or by the room or theater illumination, or by illumination from the picture. More easily visible colors than black are to be preferred, however. Bright colored or highly illuminated or highly visible hoods and apertures are less than optimum. A sharp-edged, thin limiting aperture may not work well without some hood extending toward the observer or at least a small border made to simulate, by decoration, a hood with a little depth. Also, an aperture whose border is coplanar with the edge of the hood nearest the observer and of uniform color and large dimension, so that it is an obvious flat plane with a hole through which one sees the picture, may not work well.

BRIEF DESCRIPTION OF THE DRAWINGS

The invention, including its various objects, features, and advantages, may be more readily understood with reference to the following detailed description of several embodiments, taken in conjunction with the accompanying drawings, wherein like reference numerals designate like structural elements, and in which FIG. 1 is a plan view in cross-section of a first embodiment of a hood or cowl and an aperture made in accordance with the invention attached to a television set, showing various proportions and parameters of the hood-aperture mechanism;

FIG. 2 is a plan view in cross-section of the hood and aperture of FIG. 1, showing the viewing angle and the different amounts of picture seen near the edge by the two eyes;

FIG. 3 is a chart illustrating the different amounts of apparent solidity attainable by different methods of viewing different types of scenes or subject matter;

FIG. 4 is a graph showing the variation in solidity or depth effect in close-up shots as the ratio of aperture distance to screen width is varied;

FIG. 5 is a graph like FIG. 4, showing the variation in solidity for distance shots;

FIG. 10 is a perspective view of another embodiment of the present invention attached to a television receiver;

FIG. 11 is a side view, partly in section, of the apparatus of FIG. 10;

FIG. 12 is a perspective view of a drapery form of apparatus attached to a television receiver;

FIG. 13 is a side view in cross-section of the drapery apparatus illustrated in FIG. 12;

FIG. 14 is an exploded view of another embodiment of a drapery form of apparatus in accordance with the invention;

FIG. 20 shows an adaptation of the present invention to the front projection of movies or slides; and FIG. 21 shows the use of the apparatus of the present invention with rear projection of movies or slides.

DETAILED DESCRIPTION OF THE INVENTION

Figure 6:
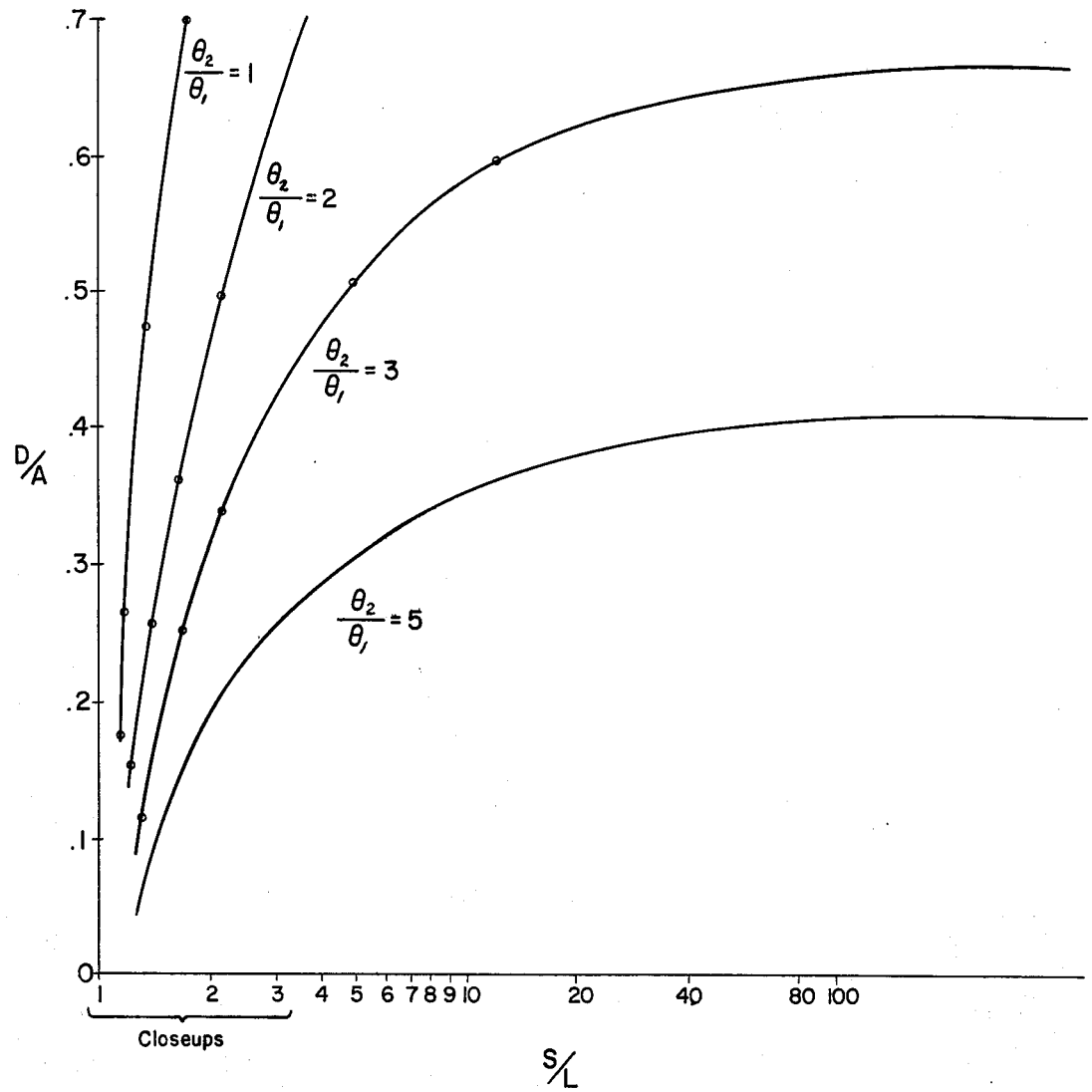
FIG. 6 is a graph showing the results of a theoretical study of the reasons for the difference between the depth effect with closeups and distance shots, as indicated in the curves of FIGS. 4 and 5.

Referring now to the drawings, FIGS. 1 and 2 show a cowl or hood 30, together with a framing or limiting aperture 32, made in accordance with the principles of the present invention, attached to a television set 31. The hood 30 may be hollow or solid, and may be made of any suitable material, such as plastic, fiberglass, metal, cardboard, styrofoam, wood, or the like. The hood 30 may be attached to the television set 31 in any convenient manner, such as by means of double-sided adhesive tape, cement or glue, clamps, screws, or the like. The hood 30 has an opening which may be generally shaped to conform with the shape of the picture being viewed, and thus may be rectangular, elliptical, or the like.

The interior of the hood 30 is provided with a projecting portion which serves as a framing aperture 32. The visible surface of the hood 30, or at least the framing aperture 32 and the portions of the hood 30 leading to it, should be clearly visible but not obtrusive. Visibility may be maintained by making the surface of the framing aperture 32 and the interior of the hood 30 of a colored or textured material. The surface of the aperture 32 and the visible surface of the hood 30 may be made of a shiny or specular material, although such material is not preferred because of the high variability of what it reflects. Somewhat dark materials, or black materials, may be used for the hood 30 and aperture 32 if they are illuminated either intentionally or by the room, theater, or picture illumination. Flat black colors which render the surface of the hood 30 and aperture 32 invisible, or nearly so, are to be avoided, as are extremely bright colors. In any event, visibility of the aperture 32, or at least of the margin of the aperture 32, contributes to the production of the depth effect.

As shown in FIGS. 1 and 2, the interior of the hood 30 may flare outwardly from the framing aperture 32 toward the viewer, as indicated by angle $\theta$ in FIG. 1. This flaring enlarges the viewing angle $\phi$ (FIG. 2). In practice, wide viewing angles may be utilized because visibility of only one edge of the picture does not detract much from the depth effect in the remainder of the picture. Also, a flared hood or cowl aids the depth effect by causing the observers' end of the funnel-like flared hood 30 to appear to be farther away from the picture plane or screen 35 than it is, because of the general assumption that the sides of cylindrical structures are usually parallel.

The depth of the hood 30, indicated at C in FIG. 1, may be from 15 to 40 percent of the picture width, with 30 percent as a typical value. Thus, if the picture is 20 inches wide, the hood 30 may have a depth C of from 3 to 8 inches. If the depth C of the hood is reduced too much, the three-dimensional effect is greatly weakened, while hoods 30 deeper than 35 percent are unnecessarily bulky and do not add appreciably to the effect.

The framing aperture 32 is smaller in dimensions than the dimensions of the picture, as shown by the overlap B in FIG. 1, so that all four edges of the picture are never visible simultaneously, and from usual viewing positions, no edges are visible. Typically, the dimension of the aperture 32 may be approximately 5 percent to as much as 20 percent less than the width of the picture. Thus, for a picture 20 inches wide, the framing aperture 32 may typically be of the order of 18 inches wide. If the framing aperture 32 has dimensions greater than approximately 95 percent of picture dimensions, the depth effect may be impaired.

The hood 30 is contoured to space the framing aperture 32 away from the picture plane or screen 35, as indicated at D in FIG. 1, and to curve outwardly the surfaces 33 connecting the aperture 32 and the picture plane or screen 35, so that the bezel or support member 34, which attaches the hood 30 to the screen 35 of the television set 31, is concealed. This prevents the viewer from easily judging the distance to the picture plane or screen 35. Also, the spacing D, between the framing aperture 32 and the picture, permits motion of the observer's head or eyes, or the binocular effect of distance between his eyes, to reveal different amounts of the picture near its edges, just as though he were looking out of a window, as indicated by lines 36 in FIG. 2.

The framing aperture 32 should be spaced away from the picture plane or screen 35 by the order of 15 percent to as much as 40 percent of a picture width, toward the observer. 30 percent of screen width for the aperture spacing D, in a hood 30 having a 35 percent depth C, are typical spacings for good depth enhancement.

Although a sharp knife-like edge on the framing aperture 32 is generally satisfactory, it has been found to be preferable if the framing aperture 32 has a visible curve or dimension in depth; i.e., normal to the plane of the screen 35, as shown in FIGS. 1 and 2. A framing aperture 32 with appreciable dimension normal to the plane of the picture edge also makes the framing aperture 32 more highly visible and prevents the viewer from unconsciously projecting its limiting edge to the surface of the screen 35, which tends to weaken the depth effect under some conditions.

A light-colored band may be provided around the perimeter of the hood 30 on the surface nearest the observer. This gives the appearance of a funnel-like structure, even to an otherwise short non-funnel structure. Such a band of light color may be of value in improving a hood of any depth or configuration, and even enhances the converging tunnel effect in converging tunnel hoods. Such a band is illustrated later in FIGS. 9, 16, and 17, as item 43.

The outside surface of the hood 30 may be convoluted, as shown in FIGS. 1 and 2. to prevent the making of an easy secondary judgment around the outside as to the location of the picture plane or screen 35, and to prevent judging the depth C of a converging funnel by a view of the funnel from the outside. If the outer surface of the hood 30 is flat and rectangular, for example, the eye naturally follows these straight lines to the front of the television set 31. This provides a clue to the location of the picture plane or screen 35, which may detract from the depth effect. Also, the outside surface of the hood 30 may be contoured, as shown, to provide clearance for adjacent knobs and controls on the television set 31.

Anything which enables the viewer and his brain to identify the screen 35 of the glass picture tube tends to diminish the appearance of depth. Too much brightness in a television picture without appropriate contrast tends to show retrace lines of noise in the dark areas and defines the screen 35 of the picture tube. A generally noisy picture with noise dots scattering randomly over the surface defines the surface of the screen 35 of the picture tube and tends to diminish the effect. An obvious room light reflection off of the glass defines the glass in the area of reflection, but has been found not to be too detrimental to the remainder of the picture, and appears suspended in space, if not too widespread.

A paper or cardboard tube of typically one and one-half inches in diameter and 8 to 12 inches in length placed at the eye may be used as a standard to measure the optimization of parameters in the hood 30 of the present invention. If the parameters are not close to their optimum values, in accordance with the teachings of the present invention, looking at the picture through a tube held at the eye shows a much greater depth effect than is produced by the hood 30. At near optimum values of the parameters, little or no change is observed as between a tube at the eye and the hood 30.

FIG. 3 approximately defines the general regions of apparent solidity, with 100 percent denoting reality using two eyes, and normal flat pictures being 0 to 10 percent (perhaps 0 to 20 percent for color television or movies) when viewed at normal viewing subtended angles (10° to 25° approximately, depending on perspective, content, etc.). Reality when viewed with one eye is placed at 50 percent. Highly perspective, clear, colorful flat pictures viewed through a tube held at the eye may reach 55 percent, slightly exceeding one eye looking at the real world, according to the subjective views of several observers.

On this general subjective scale, variations of the critical parameters of the hood 30 and aperture 32 of the present invention may vary the depth solidity subjectively observed over the general range of 30 percent to 55 percent with good pictures containing strong perspective. With exceptional subject matter, peaks of slightly greater than 60 percent have been observed.

FIGS. 4 and 5 show observations of the degree of solidity observed subjectively when one of the major key parameters D/A (the ratio of aperture distance from the screen to screen width) was varied using pictures with good perspective content.

FIG. 4 shows that a D/A of 0.15 or 0.20 is quite sufficient for close-ups. It is possible that on some scenes more than 25 percent for D/A is actually productive of less than optimum solidity. FIG. 5 shows that on distance scenes, solidity improves as D/A increases, with 0.5 for D/A producing nearly all of the effect attainable. However, extending D/A above 0.3 may result in such a large hood 30 that it begins to detract from the depth effect. D/A need be only 0.2 for optimum in close-up, and a hood 30 having D/A about 0.2 to 0.3 makes for a practical attachment for a television receiver. A hood 30 having D/A more than 0.3 or 0.4 may be a bulky, unsightly attachment approaching the size of the television set 31 and is not only unnecessary, but may be deleterious to the depth effect.

FIG. 6 shows the plotted result from a theoretical derivation of D/A for the difference between the depth effect with close-ups and distance shots, as indicated in the observed curves of FIGS. 4 and 5, and is based on the assumption that the reduced or miniaturized picture on the screen should show the same fraction of picture width difference between the two eyes, looking past the edge of a window, as would have occurred for the original scene through a comparable window. In FIG. 6, S/L is the ratio of apparent distance to the real scene to distance of the observer from the television screen. (Apparent distance to the real scene varies as one uses normal, telephoto, or wide angle lenses.) $\theta_2/\theta_1$ is the ratio that the subtended angle of the real scene is reduced or miniaturized in putting it on a television screen as seen from the observer's position. D/A is the ratio of aperture spacing from the screen to width of the screen. Normal camera lenses provide $\theta_2/\theta_1$ of about 4. Only telephoto lenses get to $\theta_2/\theta_1$ approaching 2 or 1, but that parameter is offset by the fact that distance of the apparent real scene S is much reduced by the magnification ratio before the miniaturization to the television screen occurs.

Thus, it is clear why D/A = 0.2 is sufficient for all close-up shots, whereas D/A of 0.4 or 0.5 is better for distance shots. Fortunately, distance shots seldom are affected much by binocularity, and converging parallel lines or perspective is much more important. For close-ups or middle distance telephoto, D/A = 0.3 appears quite useful. However, D/A = 0.2 results in a non-bulky hood 30, and still provides a very good depth effect.

Figure 7:
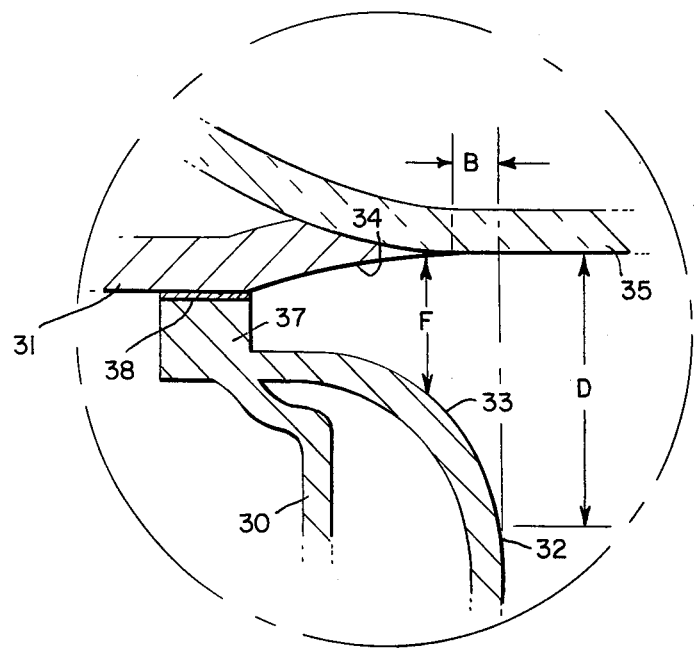
FIG. 7 is an enlarged view in cross-section of a portion of a modified embodiment of the present invention.

FIG. 7 is an enlarged view of a portion of the hood 30 and television receiver 31, showing the relative proportions and details of the structure at the edge of the television screen 35 where the hood 30 is attached to the television receiver 31. As previously described, an important parameter is the ratio of the dimension D at the limiting or framing aperture 32 in FIG. 7 to the total visible screen width A of FIG. 1. Dimension B of FIG. 7 or the amount of overlap, should be sufficient that for most normal viewing angles $\phi$ of FIG. 2 the attachment of the screen 35 to the normal bezel or support member 34 of the television receiver 31 is not visible. It is also important that even at extreme viewing angles, where the bezel or support member 34 becomes slightly visible at one or two edges, the dimension F shows a clear gap between the last visibly remaining surfaces 33 of the hood 30. This dimension F may be in the range D to as small as 0.1D, but small values may cause a loss of the depth effect as it begins to clearly permit identification of the plane of the screen 35 and its attachment to the limiting or framing aperture 32 and the cowl or hood 30.

To further increase dimension F, the hood 30 may be provided with a protruding member 37, as shown in FIG. 7, which spaces the hood 30 and the framing aperture 32 away from the television set 31. As shown in FIG. 7, the hood 30 may be mounted to the television set 31 by adhesive means 38 which may be double-sided adhesive tape, cement, glue, or the like. If desired, the hood 30 may also be incorporated as an integral part of the television set 31 at the time of manufacture, even within the cabinet.

Figure 8:
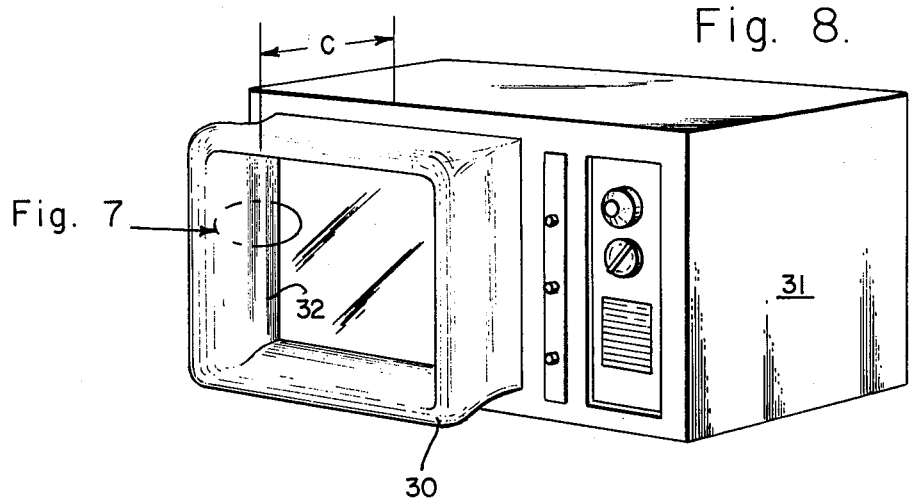
FIG. 8 is a perspective view of the apparatus of FIG. 7 attached to a television receiver.

FIG. 8 is a perspective view illustrating a hood 30 made in accordance with the teachings of the present invention, in place on the television receiver 31. It should be understood that the proportions of the cowl or hood 30 as shown in FIG. 8 may vary, as described earlier. C, as shown, is near an optimum of about 0.4A to go with excellent D/A values of 0.25 to 0.35.

Figure 9:
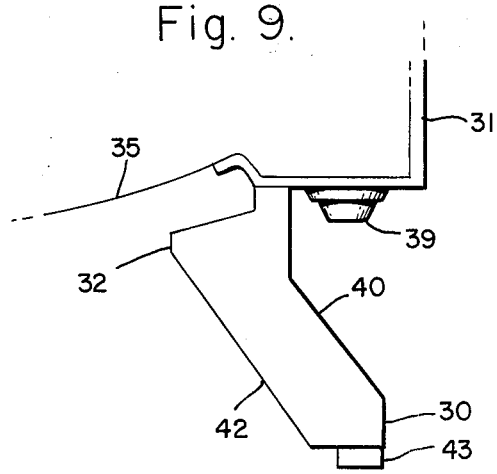
FIG. 9 is a view in cross-section of an alternative embodiment of the invention.

FIG. 9 shows an alternative form of cowl or hood 30 made in accordance with the teachings of the present invention, in which the exterior of the hood 30 is cut away at 40 for the purpose of permitting access to the adjustment levers or knobs 41. An additional advantage of the cutaway 40 is that it gives an appearance of delicacy and light weight to the cowl or hood 30 and helps to disguise the distance of the edge of the hood 30 from the television set 31 and hence the plane of the screen 35. The interior surface 42 of the cowl or hood 30 is a straight surface expanding outward toward the observer, rather than a curved surface as in FIGS. 1 and 2. Such straight surfaces 42 have been found to work almost as well as the curved surfaces.

The surface of the cowl or hood 30 closest to the observer may be provided with a decorative strip 43 which typically runs completely around the perimeter (all four edges if it is rectangular) of the cowl or hood 30, or may be used only on side or top edges. Such a decorative strip 43, if somewhat lighter in tone or of a lighter color than the interior surface 42 of the hood 30, produces an illusion of greater depth for the hood 30 and permits the dimension C to be substantially reduced through reducing the length of the flaring interior surface 42, while maintaining the same degree of depth enhancement in the picture if the considerations on D/A for placement of the limiting aperture 32 are maintained in accordance with the teachings of the present invention.

FIGS. 10 and 11 show an embodiment of the principles described in which the cowl or hood 30 is shown as though carved from a solid block of material such as urethane, for example.

The proportions are exaggerated to about the upper limit of extension ever found necessary from the television receiver 31 even when collapsed tight to the receiver 31 along the rods 44, provided D/A produced by the aperture 32 is in the range 0.25 to 0.35 as previously described. An attachment mechanism is provided consisting of telescoping or adjustable mounting rods 44 fastened to the television receiver 31 by any suitable means, such as a screw, adhesive or a banding mechanism, as is well known in the art. The adjustable rods 44 also permit a variation in the parameter C in accordance with the viewing habits or preferences of the observer, but would normally leave an open space only with a much shorter hood. Normally, the cowl or hood 30 is found to work very satisfactorily for depth enhancement if the outer surface of the hood 30 closest to the television receiver 31 is pushed up tight to the receiver 31, as shown in FIG. 11, and the total dimension C becomes about 0.3 to 0.4 of the screen width. As shown in FIGS. 10 and 11, the interior of the hood 30 may be provided with a wavelike configuration leading up to the limiting or framing aperture 32.

FIGS. 12 and 13 show a drape-like embodiment of the principles described here in which folded drapes 51, 52, 53 of cloth, leather, paper, or similar material, are held by rods 41 to form a graceful, undulating hood 30 (the right side of the hood 30 in FIG. 12 is omitted to permit visibility of the form of the edge of the top 51 and bottom 52 portions of the cowl or hood 30). The draped material may be perforated as at 54 in FIG. 13 to slide on the rods and then artfully and gracefully folded (or it may have been folded first and then glued or otherwise fastened to the rods as in 55 of FIG. 12). An alternative for inexpensive manufacture is shown in FIG. 14, in which the folded drape-like material 51, 52, 53 is stapled or otherwise fastened to stiff board structures 56 which are put together to form a rectangular cowl or hood to carry out the principles of FIGS. 1 through 7. In all cases, a limiting aperture 32 should be formed by the draping whose critical distance D/A from the screen 35 is governed by the principles of FIGS. 1 through 7.

Figure 15:
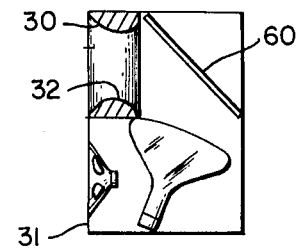
FIG. 15 is a side view in cross-section of an embodiment of the present invention installed as an integral part of the cabinet of a television receiver.

FIG. 15 shows one method of mounting a hood 30, and a limiting aperture 32, within the confines of a console television receiver 31 through the use of a reflecting mirror 60. All of the previously shown cowl or hood arrangements of FIGS. 1, 2, 7, 8, 9, 10, 12, 13, and 14 may also be used in this fashion or as they were originally shown, but contained within the overall box of the television receiver.

Figure 16:
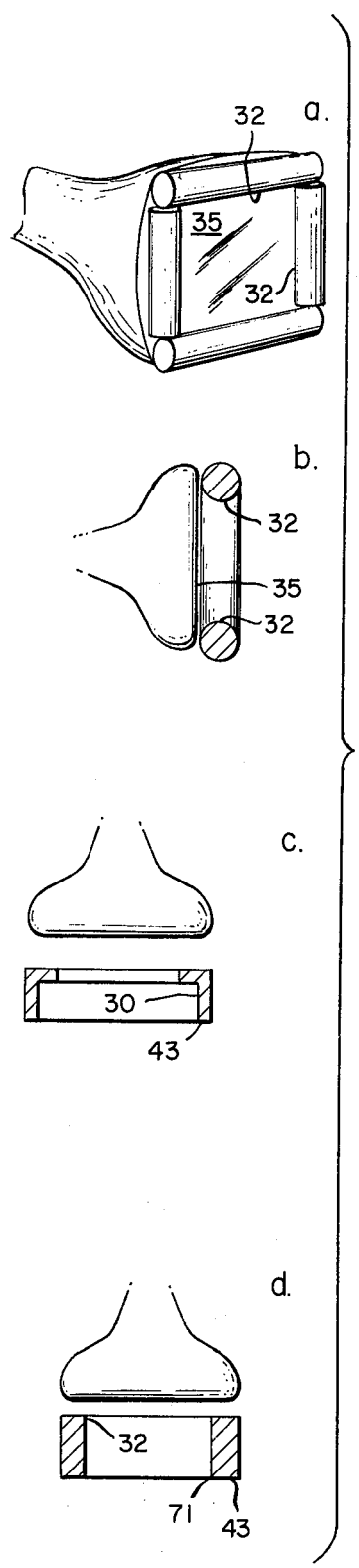
FIG. 16 shows several possible embodiments of the present invention.
Figure 17:
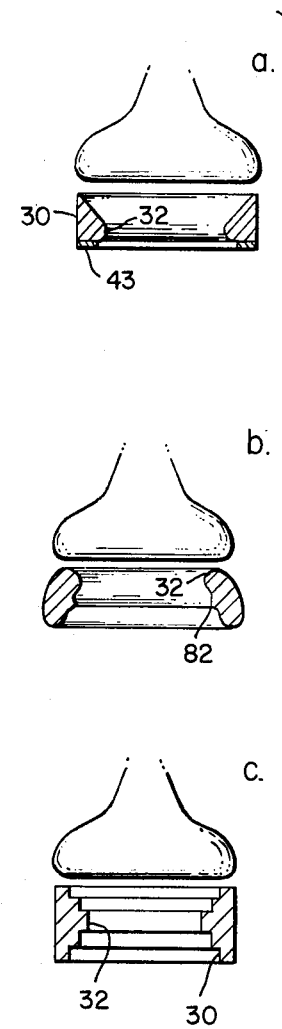
FIG. 17 shows other possible embodiments of the present invention.

FIG. 16 shows a number of alternative forms of cowl and limiting aperture illustrative of typical variations in form which may still work to a greater or lesser degree, provided the principles of aperture coverage of screen edges, D/A ratio of aperture spacing from the screen and general cowl treatment between the aperture and the observers are used.

FIGS. 16a and 16d show cylindrical forms used to make a cowl in which the innermost edge of the cylinder 32 forms the limiting aperture.

FIG. 16c shows a simple geometrical shape which works to a limited degree but sufficiently well that if the teachings of this invention on D/A and edge covering for the limiting aperture are used, important depth effects can be attained. If a rim 43 of somewhat lighter hue than that used for the cowl surface 30, in accordance with the discussion of 43 of FIG. 9, is used, better results are obtained.

FIG. 16d is another simple geometrical shape which may work to a degree and either the inner edge of the hood closest to the glass 32 or the inner edge farthest from the glass 31 may form the limiting aperture depending on the observer's position. Again, a lighter hued edge decoration 43 around the perimeter can improve the results.

FIG. 17a shows an excellent performing form of hood or cowl 30 and limiting aperture 32. With the use of an edge decoration or strip of lighter hue 43 than the rest of the cowl 30 and limiting aperture 32, this form worked as well as much deeper hoods and on some pictures was the best form found.

FIG. 17b is a relatively smooth slightly rippled form of cowl which still shows effects if 32 or 82, which act as limiting apertures for different observer positions, are in the proper ranges of D/A and picture edge covering.

FIG. 17c shows a stair-step version emblematic of other variations which are possible and still maintain a limiting aperture 32 and a cowl 30 surrounding it to which the principles described can be applied.

FIG. 17d is a smooth cowl 30 with a limiting aperture 32 which, if it covers the picture edges and D/A falls in the general ranges taught here, will function to a reasonable degree in producing a depth enhancement effect.

Figure 18:
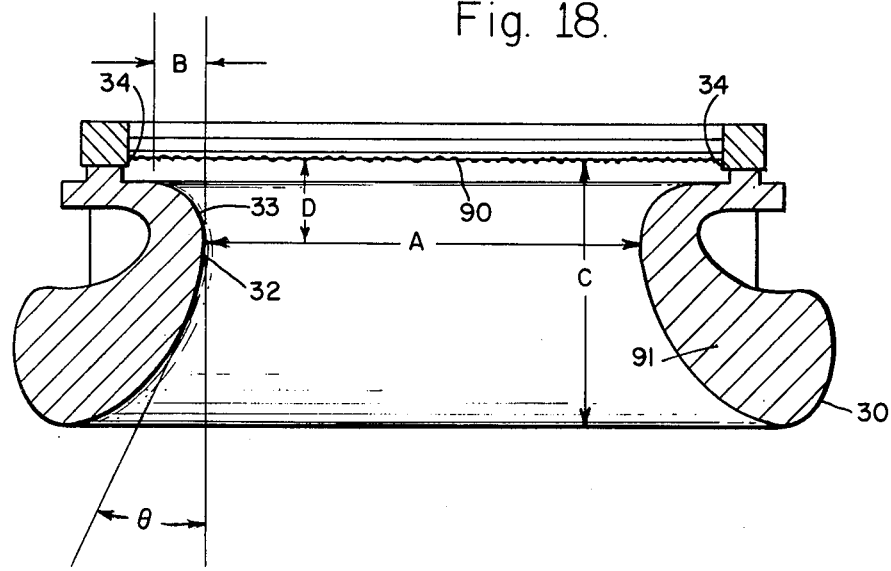
FIG. 18 shows an adaptation of the present invention to the viewing of still pictures or paintings, showing various proportions and parameters of the apparatus.
Figure 19:
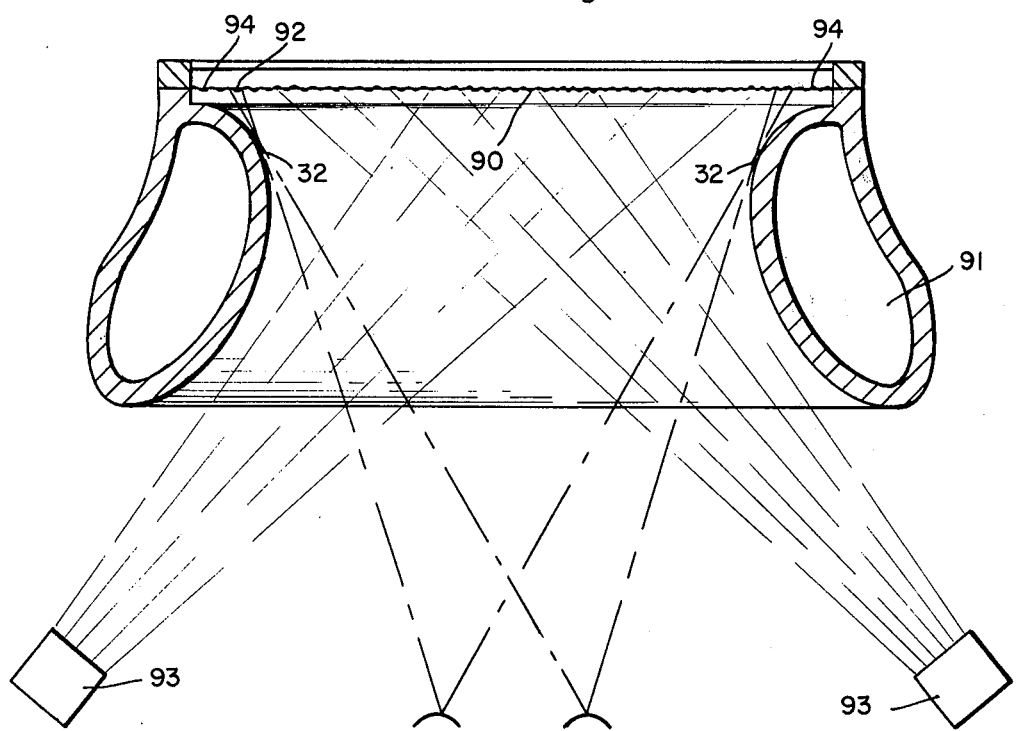
FIG. 19 shows a modified apparatus used for the viewing of still pictures and paintings, indicating the method of illuminating the picture, and illustrating the different amounts of the picture seen near the edge by the two eyes.

FIG. 18 shows a cowl or hood 30 with all of the characteristics described in FIGS. 1 through 7, especially including a limiting aperture 32 applied to a photograph or painting 90. For substantial depth effect to occur, the ratio of D/A, the limitations on B and C and the general considerations on 32, 33 and 34 should be as discussed in connection with FIGS. 1 through 7. A solid form of cowl or hood 91 is shown in FIG. 18, but all of the forms of cowls or drapes in FIGS. 1 through 14 are applicable. FIG. 19 shows a hollow form of cowl or hood 91 applied to a photograph or painting 90. All of the dimensions and their proportions as shown in FIG. 18 are applicable to FIG. 19. FIG. 19, however, shows the critical angles and the binocular phenomenon used at the picture edges in which one eye sees a slightly different amount of picture 92 near the limiting aperture 32 than does the other eye. The discussion of FIG. 2 and of FIGS. 4 through 7 apply equally well here. One additional detail of operation is illustrated with the lighting devices 93. They should be placed so that the regions of the picture 94 which are more or less shielded from observers at certain viewing angles are well lighted, so that a moving observer or each eye of a single observer, as appropriate, can see the picture in the regions 94. A single centered light might leave these regions dark and spoil the action of the D/A aperture and hence spoil the depth effect sought.

FIG. 20 shows an embodiment of the device as used in motion picture or slide projection but differs from FIG. 21 in that front projection is used. It uses a hollow form of hood 101, but solid hoods as in FIG. 21, 113, may be used. FIG. 18 also shows the angular effect of two eyes in an observer 102 looking just past the limiting aperture edge 32, causing him to see a different amount of picture 103 on the screen 104, as has been discussed at length in connection with all the previous figures. It should be kept in mind that although this edge effect is important, it is not the entire depth effect producing mechanism. It merely releases the edge of the picture 105 from an easily judged position with respect to the hood 30 and its limiting aperture 32. Hiding the picture edges and permitting the monocular dimensional clues in the center of the picture to operate are still vital to getting a strong appearance of depth. As may be seen, a great problem, exists in getting the picture projected into the region where the phenomenon embodied in 103 operates. This may be aided by using a wide angle projector 76 placed near the front of the audience. Another problem of front projection is preventing some picture showing on the hood just toward the audience from 32. This could be prevented by accurate projection edges 105 or by making the limiting aperture 32 relatively dark and putting a decorative edge of somewhat brighter hue around the perimeter of the hood as previously described with respect to 43 of FIG. 9. It should be noted that rear projection, as in FIG. 21, avoids these two difficulties of front projection.

FIG. 21 shows an embodiment of the device as used in motion picture or slide projection. 110 is a screen which permits rear screen projection and is of a form well known to those versed in the art of rear screen projection. 111 is the motion picture or rear screen projector. 112 is the general position of an audience. 113 is a solid form of hood or cowl 30 in accordance with the teachings of this invention. (Alternatively, hollow forms as in FIG. 20 are very acceptable.) Again, the existence of a limiting aperture 32 and the consideration on cowl or hood 30 depth C and other parameters such as B and separation of screen from visible portions of hood 33 are to be in accordance with the discussion of these parameters in all the earlier figures. The major new feature is that for a screen, for example 30 feet wide, the hood 30 may extend, typically, 12 feet toward the audience and the limiting aperture may be at a distance of 6 to 9 feet from the screen.

It is to be undertsood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What is claimed is:

1. Apparatus adapted to be disposed in front of a picture for enhancing the depth thereof comprising: means defining a framing aperture aligned generally parallel with a picture to be viewed and spaced away therefrom, the outer dimensions of said means being larger than the picture to be viewed, the inner dimensions of said framing aperture being smaller than the picture to be viewed to conceal the edges thereof, whereby the distance to the picture is difficult to judge, and whereby different amounts of each edge of the picture are seen by each eye of a viewer, thereby suppressing the clues to flatness of the picture and enhancing the clues to depth thereof.

2. The apparatus of claim 1 in which said framing aperture is spaced away from the picture by a distance which is generally in the range of approximately 15 percent to 40 percent of the width of the picture.

3. The apparatus of claim 2 having the general configuration of an axially short tubular hood, the axial dimension generally being in the range of approximately 15 percent to 40 percent of the width of the picture.

4. The apparatus of claim 3 in which the inner dimensions of said framing aperture are generally in the range of approximately 5 percent to 20 percent smaller than the width of the picture.

5. The apparatus of claim 4 in which the end of said hood farthest from the picture flares outwardly from said framing aperture.

6. The apparatus of claim 5 in which the inner surface of said hood has a texture and color such that said framing aperture is visible but not obtrusive.

7. The apparatus of claim 6 in which the end of said hood farthest from the picture has a light colored strip around the perimeter thereof.

8. The apparatus of claim 6 in which said hood is constructed of cloth having folds to define said framing aperture.

9. The apparatus of claim 2 having the general configuration of a mask in which the top thereof extends outwardly from said aperture toward a viewer farther than the bottom thereof.

10. The apparatus of claim 9 in which the sides of said mask taper from a relatively long axial dimension from the aperture at the top of said mask to a relatively short dimension at the bottom of said mask.

11. The apparatus of claim 2 in which the top of said aperture is displaced outwardly away from a picture to be viewed more than the bottom of said aperture.

12. The apparatus of claim 9 in which the outward dimension of the top of said mask is generally in the range of approximately 1.1 to 2 times greater than the outward dimension of the bottom of said mask.

13. The apparatus of claim 11 in which the outward dimension at the top of said mask is generally in the range of approximately 1.1 to 2 times greater than the outward dimension of the bottom of said aperture.

14. The apparatus of claim 4 in which said framing aperture is aligned with the picture on a television receiver.

15. The apparatus of claim 4 in which said framing aperture is aligned with a projection screen.

16. The apparatus of claim 15 in which said projection screen is a motion picture projection screen.

17. The apparatus of claim 16 in which said projection screen is a slide projection screen.

18. The apparatus of claim 4 in which said framing aperture is aligned with a still photograph.

19. The apparatus of claim 4 in which said framing aperture is aligned with a painting.

20. Apparatus adapted to be disposed in front of the screen of a television receiver to enhance the depth of a television picture comprising:

an axially short generally tubular hood having a framing aperture therein, said framing aperture being spaced away from the end of said hood closest to the television screen by a distance which is generally in the range of approximately 15 percent to 40 percent of the width of the screen, the outer dimensions of said hood being larger than the television screen and the inner dimensions of said framing aperture being smaller than the television screen by an amount generally in the range of approximately 5 percent to 20 percent of the width of the screen, the axial dimension of said hood being generally in the range of approximately 15 percent to 40 percent of the width of the television screen.

21. The apparatus of claim 20 in which the end of said hood farthest from the television screen flares outwardly from said framing aperture.

22. The apparatus of claim 21 in which the end of said hood closest to the television screen curves outwardly from said framing aperture so that no surface can be seen connecting said framing aperture to the television receiver and a substantial clearance exists between the last visible portion of said hood and the television screen.

23. The apparatus of claim 22 in which the inner surface of said hood has a texture and color such that said framing aperture is clearly visible but not obtrusive.

24. The apparatus of claim 23 in which the end of said hood farthest from the television screen has a higly visible strip around the perimeter thereof.

25. A television receiver comprising:
a cabinet;
a picture tube disposed in said cabinet for producing a television picture;
said cabinet having an opening for viewing said television picture; and
means defining a framing aperture disposed in said opening, said framing aperture being spaced away from said television picture, the inner dimensions of said framing aperture being smaller than said television picture by an amount generally in the range of approximately 5 percent to 20 percent of the dimensions of said television picture.

26. The television receiver of claim 25 in which a mirror is disposed within said cabinet to reflect said television picture from said picture tube through said opening.

27. Apparatus adapted to be disposed in front of a projection screen to enhance the depth of a projected picture comprising:

an axially short generally tubular hood having a framing aperture therein, said framing aperture being spaced away from the end of said hood closest to the projection screen by a distance which is generally in the range of approximately 15 percent to 40 percent of the width of the screen, the outer dimensions of said hood being larger than the projection screen and the inner dimensions of said framing aperture being smaller than the projection screen by an amount generally in the range of approximately 5 percent to 20 percent of the width of the screen, the axial dimensions of said hood being generally in the range of approximately 15 percent to 40 percent of the width of the projection screen.

28. The apparatus of claim 27 wherein said hood is disposed in front of a moving picture projection screen.

29. The apparatus of claim 27 wherein said hood is disposed in front of a slide projection screen.

* * * * *